United States Patent [19]

Johnson et al.

[11] Patent Number: 4,503,643
[45] Date of Patent: Mar. 12, 1985

[54] SHARPENER ASSEMBLY FOR THE CUTTING CYLINDER OF A CROP HARVESTER

[75] Inventors: John F. Johnson, Wichita; Richard J. Buller, Newton; Ronald K. Guinn, Valley Center, all of Kans.

[73] Assignee: Hesston Corporation, Hesston, Kans.

[21] Appl. No.: 418,438

[22] Filed: Nov. 15, 1982

[51] Int. Cl.³ .............................................. B24B 3/55
[52] U.S. Cl. ................................... 51/247; 83/174.1
[58] Field of Search ................... 51/246, 247, 249, 71, 51/72 R; 76/82.1, 82; 83/174.1

[56] References Cited

U.S. PATENT DOCUMENTS

| | | |
|---|---|---|
| 1,047,814 | 12/1912 | Johansen . |
| 1,888,285 | 11/1932 | Muir . |
| 2,032,731 | 3/1936 | Wilson et al. . |
| 2,476,177 | 7/1949 | Bloom et al. . |
| 2,733,561 | 2/1956 | Korby . |
| 2,829,692 | 4/1958 | Innocenti .............................. 51/247 |
| 2,835,299 | 5/1958 | Pollmann .............................. 51/247 |
| 3,059,384 | 10/1962 | McClellan . |
| 3,748,786 | 7/1973 | Elsner et al. .......................... 51/249 |
| 4,022,093 | 5/1977 | Ray ...................................... 51/249 |
| 4,031,670 | 6/1977 | Murphy ................................ 51/250 |
| 4,127,980 | 12/1978 | Ferguson .............................. 51/250 |
| 4,189,875 | 2/1980 | Flenniken ............................. 51/250 |
| 4,246,729 | 1/1981 | Murphy ................................ 51/250 |

Primary Examiner—Roscoe V. Parker
Attorney, Agent, or Firm—Schmidt, Johnson, Hovey & Williams

[57] ABSTRACT

The cutter box which houses a cutting cylinder on a harvester has an access opening in its top wall through which an abrasive, full-length sharpening stone may be alternately inserted and removed to engage and sharpen the peripherally located knives of the cylinder as the latter is rotated. Each time the stone is rocked down into the opening for a sharpening operation, it is indexed slightly further into the opening than during the previous operation in order to accommodate the slightly reduced diameter of the cylinder due to material which has been removed from the knives and the stone during the previous sharpening operation. A cover coupled with the stone is caused to move into closing relationship with the opening as the stone is rocked out of the same and, conversely, to pull away from and expose the opening as the stone is subsequently reinserted. All of the mechanical movements involved, including indexing of the stone, may be accomplished remotely through the use of an electric motor.

12 Claims, 9 Drawing Figures

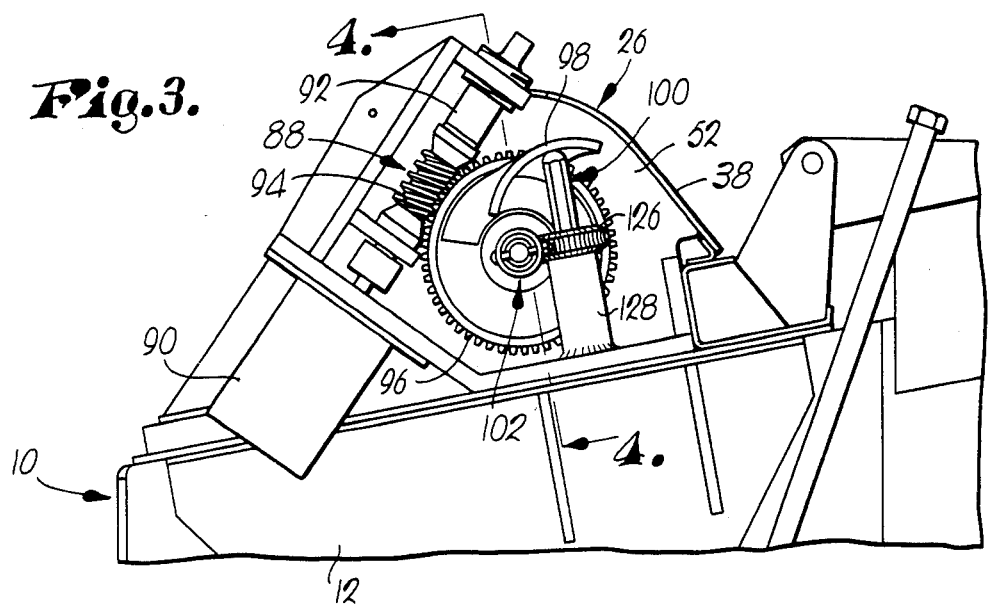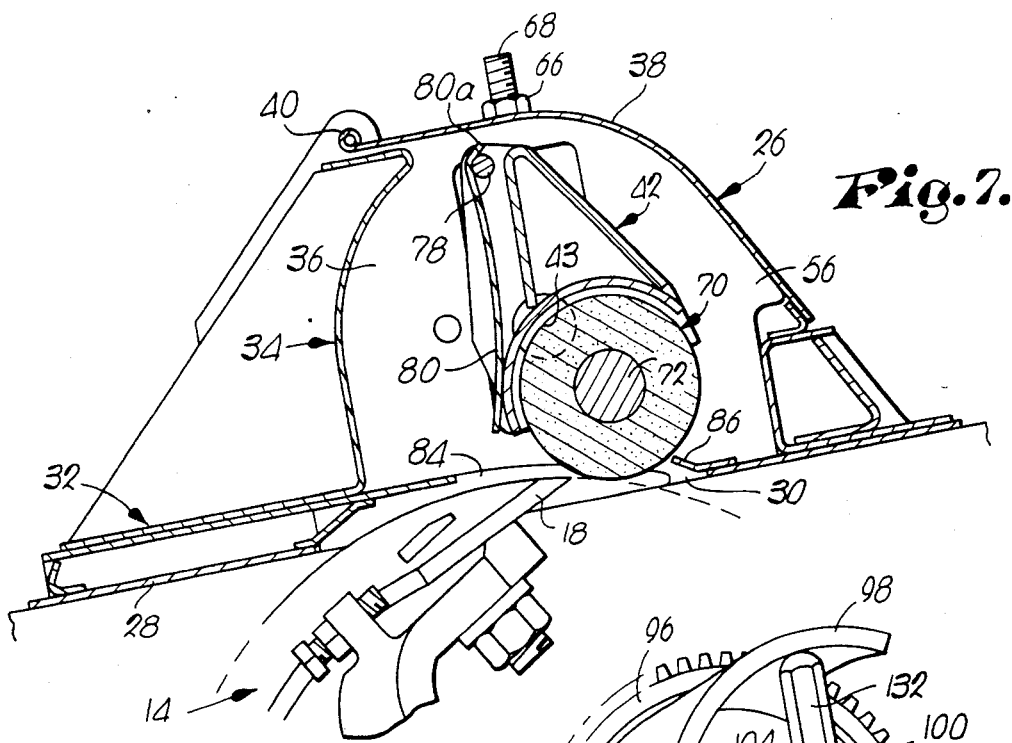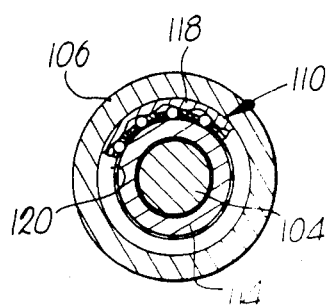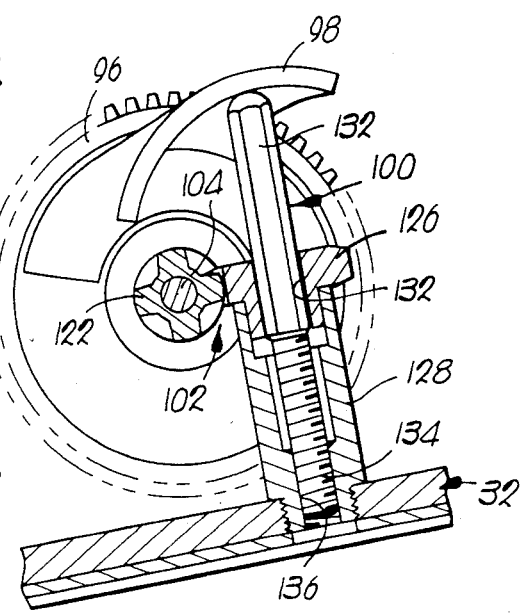

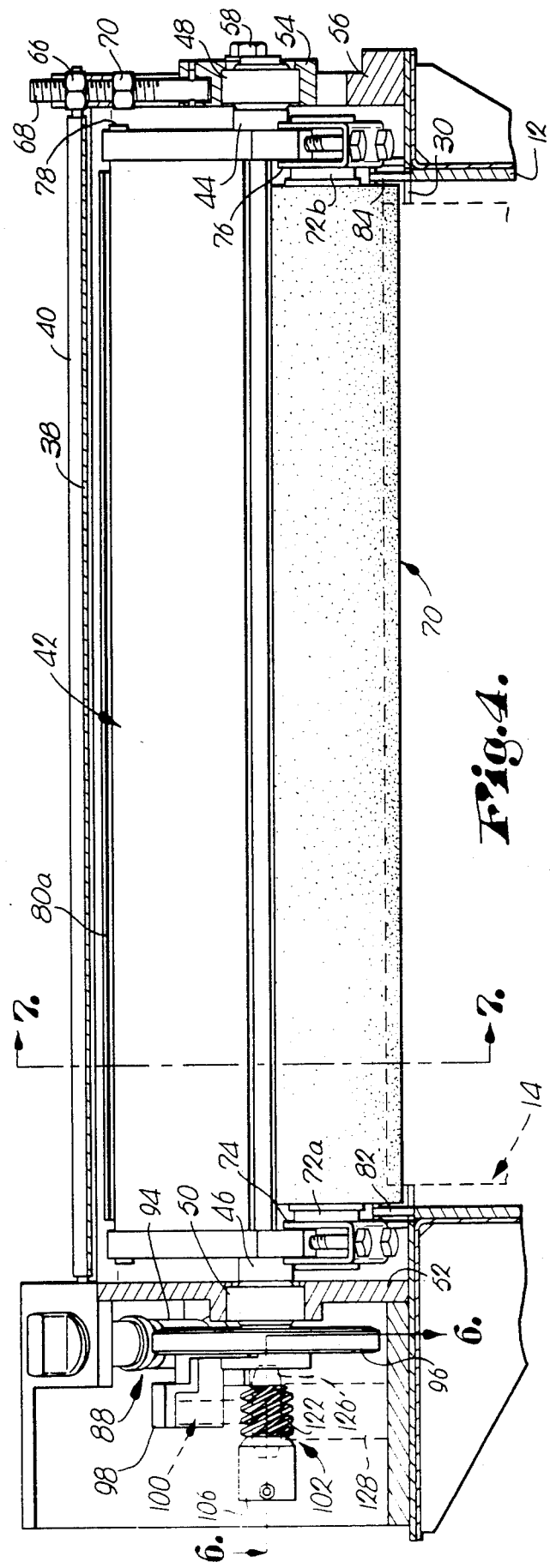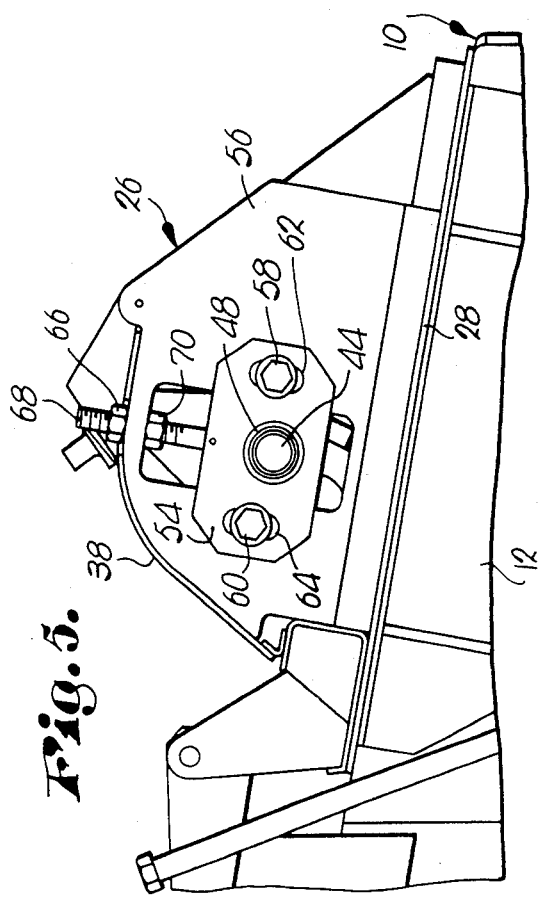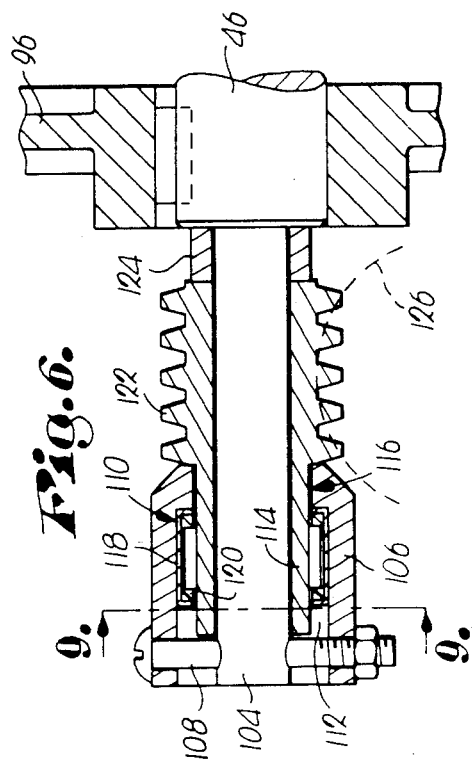

SHARPENER ASSEMBLY FOR THE CUTTING CYLINDER OF A CROP HARVESTER

TECHNICAL FIELD

This invention relates to sharpeners for the rotary cutting cylinder of crop harvesters.

BACKGROUND ART

The peripherally located knives of such cylinders require frequent sharpening in order to obtain the desired uniformity in chop length of crop materials being passed through the cylinder and to minimize the horsepower requirements associated with the cutting or chopping operation. At the same time, however, it is desirable to carry out such sharpening operation in a fast, effective and yet safe manner.

SUMMARY OF THE PRESENT INVENTION

Accordingly, the present invention contemplates a sharpener which is so designed that, it is operated remotely and while the cylinder is rotating so that convenience and speed are maximized, while the time expended in actually effecting the sharpening without performing harvesting operations, is held to a minimum. Furthermore, recognizing that the metal of the knives is progressively ground away during successive sharpening operations, the sharpener of the present invention is provided with a special indexing arrangement by which the sharpener is allowed to position itself slightly closer to the axis of rotation of the cylinder each time the sharpener is brought into engagement with the knives. A cover associated with the sharpener is adapted to alternately close off and expose the opening in the housing through which the sharpener projects during engagement with the knives, and such operation of the cover is made responsive to movement of the sharpener between its standby and sharpening positions so as to close the opening and not interfere with harvesting operations when the sharpener is idled but to then expose the opening for the sharpener when it is time to temporarily interrupt the harvesting operations and prepare the cutting edges of the knives.

BRIEF DESCRIPTION OF THE DRAWINGS

FIG. 3 is a fragmentary elevational view of the cutter box and sharpener assembly of FIG. 1 but illustrating the condition of components on the outside of the assembly when the sharpening stone is down in engagement with the knives of the cylinder;

FIG. 4 is a fragmentary cross-sectional view of the sharpening assembly taken substantially along line 4—4 of FIG. 3 when the stone is in its sharpening position;

FIG. 5 is a fragmentary elevational view of the opposite side of the cutter box and sharpener assembly;

FIG. 6 is an enlarged, fragmentary, detail cross-sectional view of a portion of the indexing apparatus at one end of the sharpener taken substantially along line 6—6 of FIG. 4.

FIG. 7 is a fragmentary, vertical cross-sectional view of the sharpener assembly similar to FIG. 2 but with the stone in its sharpening position and the cover exposing the access opening to the interior of the cutter box;

FIG. 8 is an enlarged, fragmentary detail view of other portions of the index apparatus and limit stop arrangement for determining the position of the sharpening stone during each movement thereof into engagement with the knives, parts being shown in cross-section and in elevation to reveal details of construction; and FIG. 9 is a transverse cross-sectional view through the one-way clutch of the indexing apparatus taken substantially along line 9—9 of FIG. 6.

DETAILED DESCRIPTION

Figure 1:
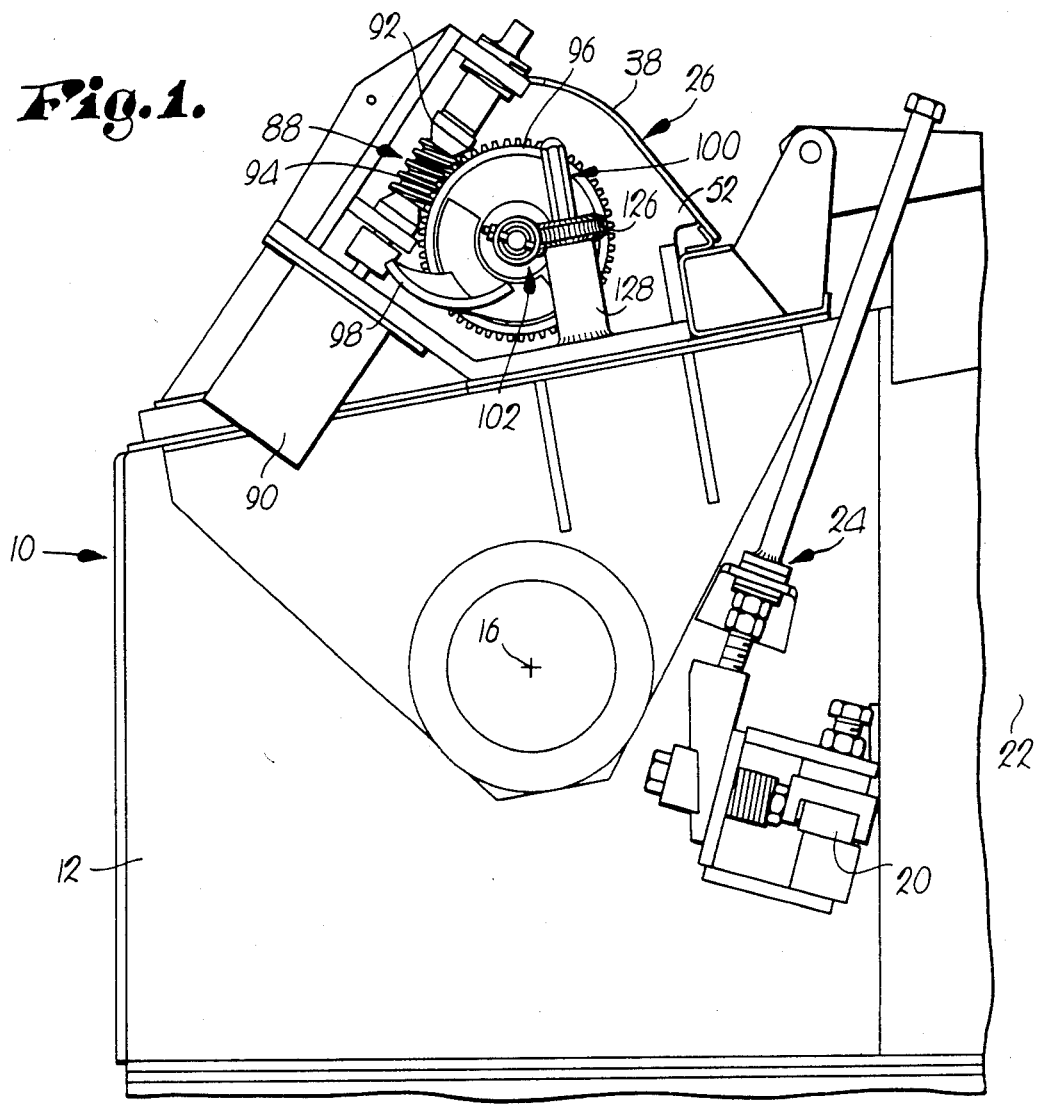
FIG. 1 is a fragmentary side elevational view of the cutter box on a crop harvester having a sharpener assembly in accordance with the principles of the present invention mounted thereon.

The cutter box 10 of the harvester broadly includes a housing 12 having a cutting cylinder 14 rotatably mounted therein for high speed rotation about an axis 16. A plurality of elongated knives 18, extending generally parallel to the axis 16, are mounted at the periphery of the cylinder 14 in circumferentially spaced relationship for cooperation with a stationary shear bar 20 in chopping or cutting crop materials into countless small segments as they are fed into the housing 12 generally in the direction of the arrow 22 in FIG. 1. An adjustment assembly 24 as shown in FIG. 1 may be coupled with the shear bar 20 for permitting the operator to adjustably shift the shear bar 20 toward and away from the cutting cylinder 14.

Figure 2:
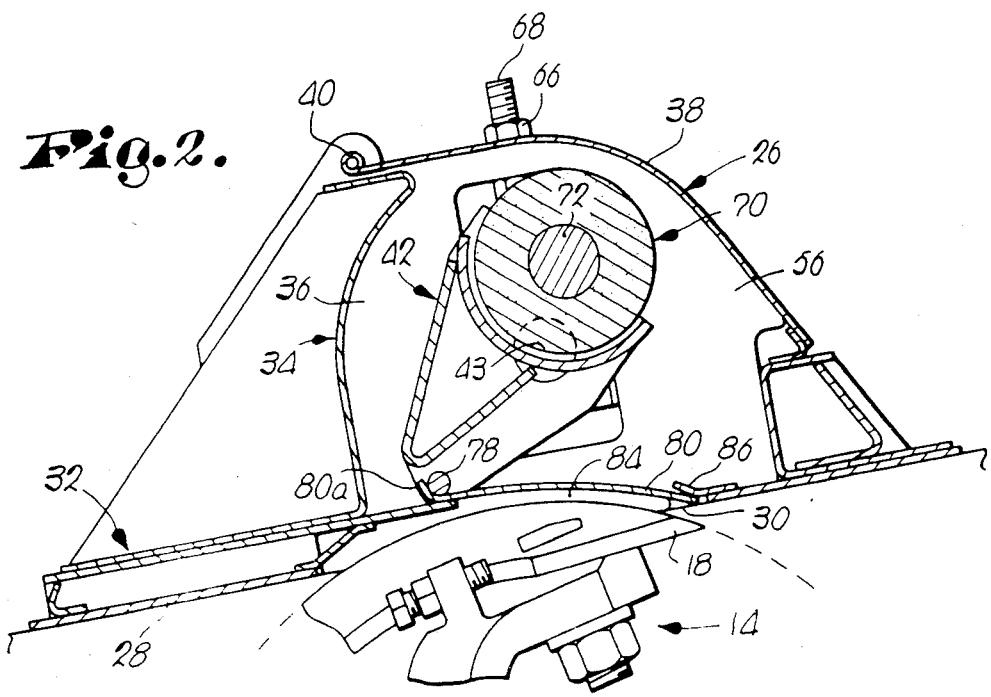
FIG. 2 is a slightly enlarged, vertical cross-sectional view through the sharpener assembly of FIG. 1 showing the abrasive stone thereof in its standby position with the cover closing the access opening to the cutting cylinder.

The sharpener assembly 26 of the present invention is mounted on the cutter box 10 and attached to the top wall 28 thereof directly above an access opening 30 in the top wall 28 as illustrated particularly in FIGS. 2 and 7. The assembly 26 itself broadly includes a frame or chassis 32 to which other components of the assembly 26 are attached, including a hood 34 defining an internal chamber 36 normally closed by an outwardly bowed door 38 which is swingable about a hinge 40 between open and closed positions.

A special rocking carrier 42 is housed within the chamber 36 and has an axis 43 of rocking movement or rotation (FIGS. 2 and 7) defined by a pair of stub shafts 44 and 46 which project outwardly from opposite ends thereof for rotational support by corresponding bearing assemblies 48 and 50. The bearing 50 is supported by an endwall 52 of the hood 34 while the bearing 48 is supported by an adjustable end plate 54 as shown in FIG. 5 which, in turn, is attached to an opposite endwall 56 of the hood 34. By releasing set screws 58 and 60 which pass through vertically elongated slots 62 and 64 respectively in the end plate 54 to secure the same to the endwall 56, the end plate 54 may be selectively adjusted upwardly or downwardly by appropriately turning a nut 66 associated with a threaded bolt 68 that couples the plate 54 with an upper extremity of the endwall 56. A lock 70 associated with the bolt 68 should also be loosened and subsequently retightened in connection with the plate adjustment.

As shown perhaps best in FIG. 4, the opening 30 extends substantially completely across the housing 12 of the cutter box 10, and it is to be understood that, likewise, the cutting cylinder 14 substantially spans the two opposite sides of the housing 12. Thus, it can be seen and will be appreciated that, as shown in FIG. 4, the carrier 42 overlies the opening 30 along the full length of the latter and slightly beyond the opposite end extremities thereof whereat it is supported by bearings 48, 50 and the endwalls 52, 56.

A cylindrical grinding stone member 70 only slightly shorter than the length of the opening 30 is secured to the carrier 42 for rocking movement therewith about the axis 43. The stone 70 is maintained with its longitudinal axis in parallelism with the rocking axis 43 and has a central core shaft 72 having opposite stub ends 72a and 72b as shown in FIG. 4 which are releasibly held by a pair of clamps 74 and 76 (FIG. 4) at opposite ends thereof. The clamps 74, 76 securely hold the stone 70 on the carrier 42 for rocking movement therewith yet, when loosened, permit the stone 70 to be adjustably rotated about its longitudinal axis to expose a different portion of this periphery for knife engagement during the sharpening operation as will hereinafter become apparent.

As shown perhaps most clearly in FIGS. 2 and 7, the stone 70 is supported by the carrier 42 at a distance from the rocking axis 43, or on one side thereof. On the other side of the axis 43, a long rod 78 is supported by the carrier 42 in parallel relationship to the axis 43. The rod 78 extends the full length of the carrier 42 and is pivotally supported at its opposite ends by end extremities of the carrier 42 such that the rod 78 can pivot about its longitudinal axis. Thus, the rod 78 serves as a hinge pin for a slightly arcuate cover plate 80 having a length substantially corresponding to that of the opening 30 and a width slightly exceeding that of the opening 30. The cover plate 80 has an upturned marginal edge 80a along one longitudinal extremity thereof which is welded or otherwise permanently affixed to the rod 78 so that the cover plate 80 is rendered swingable about the longitudinal axis of the rod 78.

As illustrated in FIG. 7, the cover plate 80 hangs freely from the rod 78 in a substantially upright manner when the carrier 42 is in the grinding position, but when the carrier 42 is in a standby position as illustrated in FIG. 2, the cover plate 80 overlies and closes off the opening 30. A pair of upwardly arched guide rails 82 and 84 (FIGS. 2, 4 and 7) are situated at opposite ends of the opening 30 just above the latter on the housing 12 in position to guide and slideably receive opposite end extremities of the cover plate 80 as the latter swings from its vertically depending position in FIG. 7 to its generally horizontal, covering position of FIG. 2. A slightly upturned retainer 86 along the leading edge of the opening 30 as shown in FIGS. 2 and 7 snuggly receives the cover plate 80 thereunder when it is in the covering position of FIG. 2.

The carrier 42 with its stone 70 and cover plate 80 is rocked about the axis 43 by apparatus broadly denoted by the numeral 88, such apparatus 88 being operable not only to rock the stone 70 back-and-forth between its grinding end standby positions, but also to locate the stone 70 slightly closer to the cutting cylinder 14 each time the stone 70 is rocked down into sharpening position. As illustrated in FIGS. 1 and 3, the apparatus 88 includes in part a reversible electric motor 90 having an upwardly and forwardly inclined output shaft 92 of which a worm 94 forms a part. The worm 94 in turn meshes with a gear 96 which is, in turn, keyed to the stub shaft 46 of the carrier 42 as illustrated in FIG. 6, thus supplying driving power to the latter. An arcuately shaped abutment 98 fixed to the gear 96 for rotation therewith and projecting outwardly therefrom is disposed to cooperatively engage an upstanding stop 100 and thereby limit the extent of clockwise rotation of the gear 96 viewing FIG. 1. When the abutment 98 is spaced away from the stop 100 as shown in FIG. 1, the carrier 42 maintains the stone 70 in its standby position with the cover plate 80 closing the opening 30, all as shown in FIG. 2. On the other hand, when the abutment 98 is situated against the stop 100 as illustrated in FIGS. 3 and 8, the carrier 42 will position the stone 70 down into the opening 30 in its sharpening position with the cover plate 80 retracted, all as shown in FIG. 7. Preferably, the motor 90 is operated by a remote switch (not shown) which may advantageously be located in the cab of the vehicle associated with the harvester, it being contemplated that the motor 90 will remain actuated for so long as the switch is closed in either of its alternative positions for rocking the stone 70 toward or away from the cylinder 14.

The apparatus 88 also includes mechanism broadly denoted by the numeral 102 for incrementally adjusting the position of the stop 100, and thereby also adjusting the sharpening position of the stone 70 in the opening 30, upon a predetermined number of rocking movements by the stone 70. Preferably, such adjustment of the stop 100 occurs after each sharpening operation. In other words, each time the stone 70 is brought into sharpening engagement with the knives 18, it will be in a slightly lower position, closer to the cylinder 14, than during the previous sharpening operation.

To this end the mechanism 102 includes an extension 104 of the carrier shaft 46 (FIG. 6) which carries a sleeve-like housing 106 at its outer end. As illustrated, the housing 106 is adapted to rotate with the shaft extension 104 by virtue of a cross pin or bolt 108. The mechanism 102 also includes a one-way roller clutch 110 contained within the cavity 112 of housing 106 in circumscribing relationship to the reduced diameter portion 114 of a sleeve 116 slideably rotatable on the shaft extension 104. The clutch 110 may be of the type provided by the Torrington Company of Torrington, Conn. under its part number "RC-121610". The outer casing 118 of the clutch 110 is pressed into the cavity 112 of housing 106 and is thus adapted to rotate with the latter in both directions of its rotation while, on the other hand, the inner race 120 of the clutch 110 is adapted to rotate with the outer casing 118 in only one direction, i.e., when the casing 118 rotates in a counterclockwise direction viewing FIGS. 1 and 3 as the stone 70 is rocked up out of the opening 30. Inasmuch as the inner race 120 is secured to the reduced diameter portion 114 of the sleeve 116, the latter is clutched by the one-way clutch 110 to rotate with the housing 106 only during the aforementioned counterclockwise rotation thereof.

The sleeve 116 is also provided with a worm portion 122 situated inboard of the reduced diameter portion 114. A spacer collar 124 encircles the shaft extension 104 between the inboard end of the worm portion 122 and the outboard end of the larger diameter shaft 46.

The mechanism 102 additionally includes a worm gear 126 meshing with the worm portion 122 and rotatably supported at the outer end of a hollow pedestal 128 secured to and projecting upwardly from the chassis 32 of the sharpener assembly 26. The gear 126 has a polygonal bore 130 disposed axially therethrough which receives the stop 100, the latter having a series of flat faces 132 thereabout corresponding in number and in general dimensions to those of the polygonal bore 130 such that rotation of the gear 126 causes corresponding rotation of the stop 100. On the other hand, the stop 100 is axially slideable through the bore 130 and has a lower, threaded shank 134 which is matingly received by an internally threaded lower portion 136 of the pedestal 128.

OPERATION

The stone 70 is normally maintained up out of the opening 30 in its standby position as illustrated in FIG. 2, at which time the abutment 98 is spaced from the stop 100 as shown in FIG. 1. The cover plate 80 at this time is securely held in its FIG. 2 position closing the opening 30. The cutting cylinder 14 rotates in a clockwise direction at this time viewing FIG. 2 in order to cooperate with the shear bar 20 in chopping incoming crops along the path of travel indicated by the arrow 22 of FIG. 1 into countless small segments of predetermined length.

If it is then desired to sharpen the knives 18 the operator should not stop the cylinder 14, although it is preferable to halt forward progress of the harvester itself.

With the cylinder 14 spinning, the operator moves the motor control switch (not shown) to the appropriate position so as to energize the motor 90 in a manner to rotate the gear 96 and thus rock the carrier 42 in a clockwise direction from its FIG. 2 position toward its FIG. 7 position. Inasmuch as the stone 70 is on one side of the axis 43 and the cover plate 82 is on the opposite side of the axis 43, such motion by the carrier 42 simultaneously causes the cover plate 80 to be drawn up away from the opening 30 and the stone 70 to be moved down toward the now exposed opening 30. This action continues until the abutment 98 strikes the upper tip of the stop 100 as shown in FIG. 3, at which time the operator may release the switch.

With the stone 70 thus projecting down through the opening 30 as shown in FIG. 7 into the path of travel of the knives 18 of the spinning cylinder 14, the lowermost periphery of the stone 70 will grind against the leading edges of the knives 18 to sharpen the same.

After the knives have been adequately sharpened, the operator may then throw the control switch into the proper position for withdrawing the stone 70 and replacing the cover plate 80. Such positioning of the control switch energizes the motor 90 in the reverse direction so that the gear 96 thereupon rotates in a counterclockwise direction viewing FIGS. 1 and 3 to correspondingly rock the carrier 42 counterclockwise.

It is during the retraction or withdrawal of the stone 70 from the opening 30 that the stop 100 is indexed downwardly by a predetermined increment so that on the next movement of the stone 70 toward the cylinder 14, the stone 70 will project slightly further through the opening 30 than during the immediately preceding sharpening operation. In this respect, it may be seen that as the shaft extension 104 of the carrier 42 rotates counterclockwise during return of the stone 70 to its standby position of FIG. 2, the one-way clutch 110 drivingly engages the housing 106 with the sleeve 116 so as to rotate the worm portion 122 thereof and correspondingly cause rotation of the stop 100 via the worm gear 126. Such rotation of the stop 100 causes the same to be threaded down into the pedestal 128 by an increment of travel dependant upon the thread pitch of the shank 134. Thus, the next time that the abutment 98 engages the stop 100, the latter will be slightly lower than during the previous operation, permitting the stone 70 to correspondingly protrude slightly further through the opening 30.

As noted earlier, the one-way clutch 110 prevents retrograde rotation of the worm portion 122 as the shaft extension 104 rotates in a clockwise direction when the stone 70 is being rocked down toward the opening 30. Consequently, the stop 100 is only progressively lowered, never raised.

It is to be appreciated that the operator may, if he so desires, adjust the position of the stop 100 more than once during the time period that he is sharpening the cylinder 14. It is only necessary in this respect that the rocking cycle of the carrier 42 be repeated a number of times corresponding to the amount of stop adjustment desired.

It will also be appreciated that the periphery of the stone 70 will become progressively worn away and flattened. By lifting the door 38, access may be gained to the clamps 74 and 76 for rotatively adjusting the position of the stone 70 as may be necessary or desirable.

We claim:

1. In combination with the rotary cutting cylinder of a crop harvester, a sharpener for the peripherally located knives of said cylinder comprising:
    an elongated abrasive member of substantially the same length as the cylinder and extending generally along side of the latter;
    means mounting said member for selective transverse movement into the path of travel of said knives for sharpening the full lengths of the latter without shifting the member axially of the cylinder; and
    apparatus operably associated with said member for positioning the same progressively closer to the cylinder after each predetermined number of said transverse movements of the member whereby to accommodate reduction in the diameter of the cylinder due to wear in the knives from sharpening by the member.

2. In the combination as claimed in claim 1, wherein said member is positioned closer to the cylinder upon each successive one of said movements.

3. In combination with the rotary cutting cylinder of a crop harvester, a sharpener for the peripherally located knives of said cylinder comprising:
    an abrasive member
    means mounting said member for selective movement into the path of travel of said knives; and
    apparatus operably associated with said member for positioning the same progressively closer to the cylinder after each predetermined number of said movements of the member whereby to accommodate reduction in the diameter of the cylinder due to wear in the knives from sharpening by the member,
    said apparatus including a stop, an abutment movable with the member and engageable with said stop to limit said movement of the member toward said axis of the cylinder, and mechanism operably coupled with said stop for incrementally adjusting the position of the latter upon said predetermined number of movements by the member.

4. In the combination as claimed in claim 3, wherein said stop is threadably rotatable during said adjustment thereof, said mechanism including means coupled with the member for rotating the stop through an increment of threading adjustment upon said predetermined number of movements by the member.

5. In the combination as claimed in claim 4, wherein said member is provided with a shaft that is rotatable during said movement of the member, said shaft having a one-way clutch associated therewith for operably coupling the shaft with the stop, said clutch being engageable to transmit driving power to said stop only during a movement of the member away from the knives.

6. In the combination as claimed in claim 1, wherein said member is provided with a motor for effecting said movement.

7. In the combination as claimed in claim 6, wherein said motor is electrically powered.

8. In combination with the cutter unit of a crop harvester including a housing having a rotary cutting cylinder therein provided with peripherally located knives, said housing having an access opening adjacent the periphery of the cylinder, a sharpener for the knives comprising:
   an abrasive member;
   means mounting said member adjacent said opening for movement into and out of engagement with said knives through the opening;
   a cover for said opening; and
   means coupling said cover with the member in a manner to alternately expose the opening in response to said movement of the member toward the opening and close the opening in response to said movement of the member away from the opening.

9. In the combination as claimed in claim 8, wherein said mounting means includes a carrier mounted for rocking motion about a certain axis, said member being secured to the carrier on one side of said axis and said cover being coupled with the carrier on the opposite side of said axis.

10. In the combination as claimed in claim 9, wherein said cover is pivotally suspended by gravity from the carrier, there being cam means provided adjacent the path of travel of the cover for guiding the same into closing relationship with the opening during rocking of the member away from the opening.

11. In the combination as claimed in claim 8, wherein said member is provided with a motor operably coupled therewith for effecting said movement thereof.

12. In the combination as claimed in claim 11, wherein said motor is electrically powered.

* * * * *